United States Patent
Arnold

(10) Patent No.: US 8,739,270 B1
(45) Date of Patent: *May 27, 2014

(54) TRUSTED, CROSS DOMAIN INFORMATION SHARING BETWEEN MULTIPLE LEGACY AND IP BASED DEVICES

(75) Inventor: Steven L. Arnold, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 381 days.

This patent is subject to a terminal disclaimer.

(21) Appl. No.: 13/090,167

(22) Filed: Apr. 19, 2011

Related U.S. Application Data

(63) Continuation-in-part of application No. 12/322,008, filed on Jan. 28, 2009, now Pat. No. 8,286,231.

(51) Int. Cl.
*H04L 29/06* (2006.01)
(52) U.S. Cl.
USPC ............. 726/13; 713/161; 713/166; 709/224; 709/225; 709/227; 370/352; 370/401; 726/1; 726/11; 726/21
(58) Field of Classification Search
CPC ................ H04L 63/0227; H04L 63/0263
USPC ................................................ 726/13
See application file for complete search history.

(56) References Cited

U.S. PATENT DOCUMENTS

| | | | | |
|---|---|---|---|---|
| 5,602,916 | A | * | 2/1997 | Grube et al. ............... 380/270 |
| 2006/0265689 | A1 | * | 11/2006 | Kuznetsov et al. ........... 717/117 |
| 2007/0204337 | A1 | | 8/2007 | Schnackenberg et al. |
| 2007/0282951 | A1 | * | 12/2007 | Selimis et al. ............... 709/205 |
| 2008/0280644 | A1 | * | 11/2008 | Hugot ..................... 455/556.2 |
| 2009/0144819 | A1 | * | 6/2009 | Babbar et al. ................ 726/13 |
| 2010/0192217 | A1 | | 7/2010 | Arnold |
| 2010/0299742 | A1 | * | 11/2010 | Declety et al. ............... 726/13 |

OTHER PUBLICATIONS

Skype-it-administrators-guide|http://download.skype.com/share/business/guides/skype-it-administrators-guide.pdf|2010|Skype|pp. 1-30.*

* cited by examiner

*Primary Examiner* — Mahfuzur Rahman
(74) *Attorney, Agent, or Firm* — Vista IP Law Group LLP; Cynthia A. Dixon

(57) ABSTRACT

The methods and systems of the present disclosure provide a high assurance means for multiple legacy communication (e.g., Mil-Std-1553 communications protocol) system users and/or devices and multiple IP based network users and/or devices to seamlessly, and in real time, share information across various security domains. Specifically, the system enables multiple legacy communication system protocols and interfaces to communicate with existing IP interfaces and protocols with a high degree of trust. The system includes a configurable filtering capability to allow for the data to be inspected prior to being passed from one security domain to another security domain.

17 Claims, 13 Drawing Sheets

IPA Bind Table

| Task Group | Local | Remote | Level |
|---|---|---|---|
| - | a.a.a.1/45018 | x.x.x.12/25 | TS |
| - | a.a.a.1/5199 | x.x.x.12/25 | TS |

*FIG. 1A*

NI Route Table

| Local | Remote |
|---|---|
| a.a.a.0/255.255.255.0 | x.x.x.0/255.255.255.0 |
| b.b.b.0/255.255.255.0 | y.y.y.0/255.255.255.0 |
| c.c.c.0/255.255.255.0 | z.z.z.0/255.255.255.0 |

*FIG. 1B*

NI Bind Table

| Task Group | Prot | Local Port | Remote |
|---|---|---|---|
| 3 | 6 | 19312 | z.z.z.12/88 |
| 5 | 6 | 19313 | z.z.z.12/89 |

*FIG. 1C*

IPB Bind Table

| Task Group | Local | Remote | Level |
|---|---|---|---|
| - | b.b.b.3/86921 | y.y.y.19/88 | U |
| - | b.b.b.3/21543 | y.y.y.19/89 | U |

*FIG. 1D*

IPC Bind Table

| Task Group | Local | Remote | Level |
|---|---|---|---|
| 2 | c.c.c.3/86921 | z.z.z.19/88 | S |
| 4 | c.c.c.3/21543 | z.z.z.19/89 | S |

*FIG. 1E*

Command Word
Message ID: 022R-Begin Cross Domain Message Transfer
            023R-Complete Cross Domain Message Transfer
Description: 1553 to IP message transfer beginning/ending

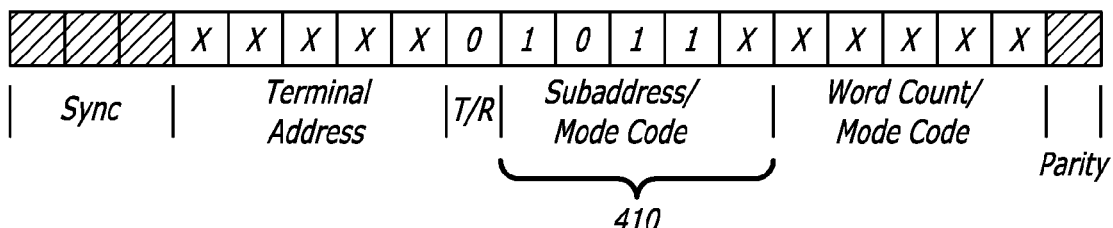

Sync = processed by the hardware
Terminal Address = Data Guard remote terminal address
T/R = 0, remote terminal is to receive data
Mode Code = "10110" (i.e. 22d)= message beginning
            "10111" (i.e. 23d) = this is the last 1553 message in this set
Word Count = 0≤x≤31 (NOTE: all 0's = 32 words)
Parity (Odd parity is used) = processed by the hardware Data Word 1 (IP Header)

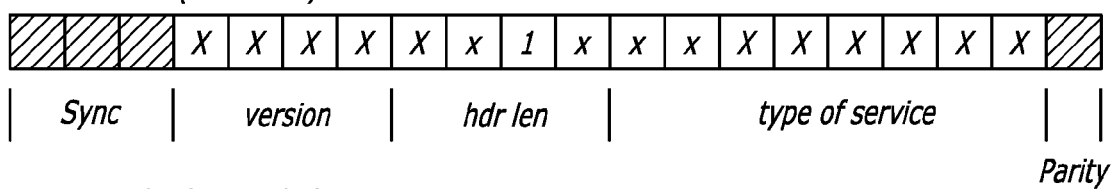

Data Word 2 (IP Header)

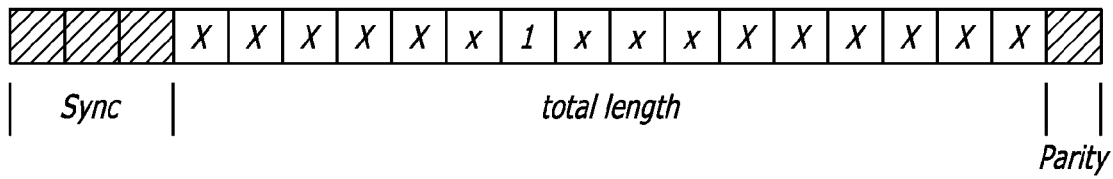

Data Word 3 (IP Header)

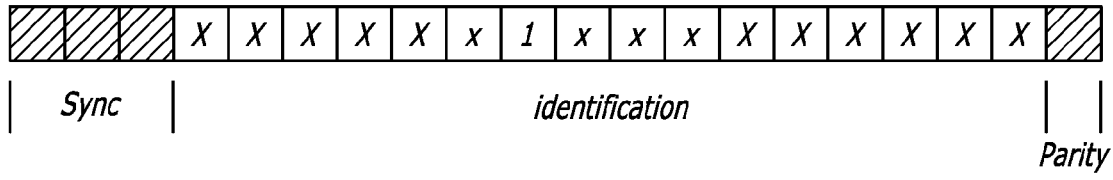

Data Word 4 (IP Header)

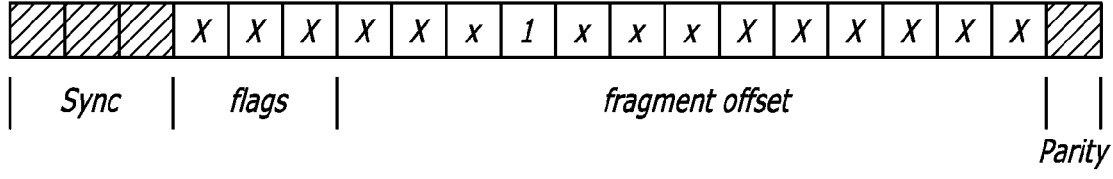

FIG. 4A

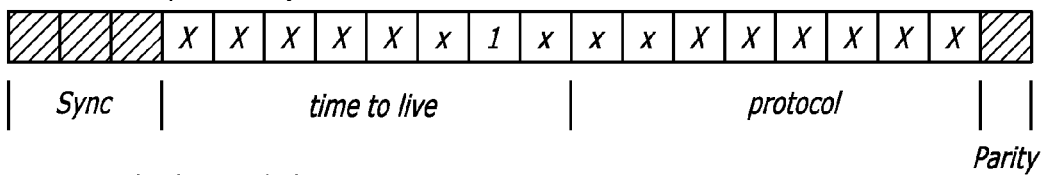
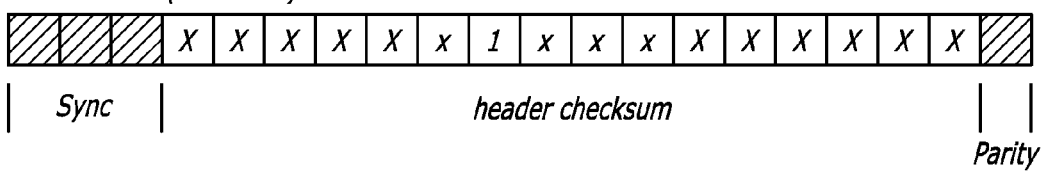
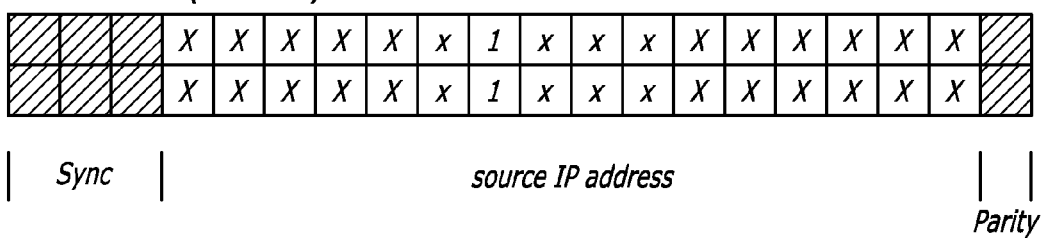
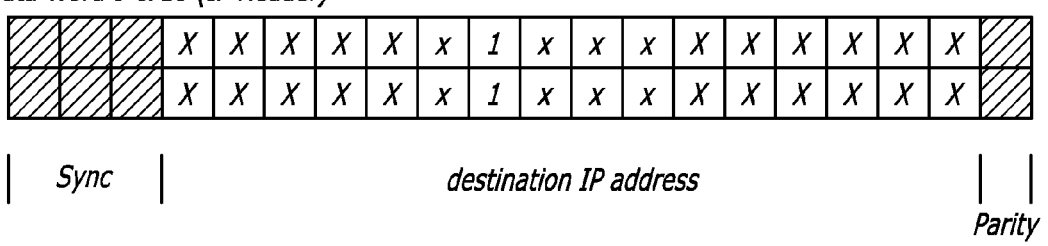
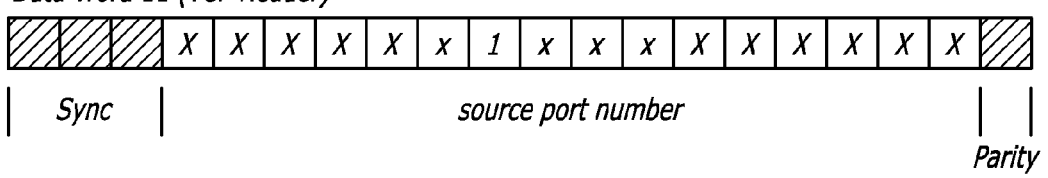
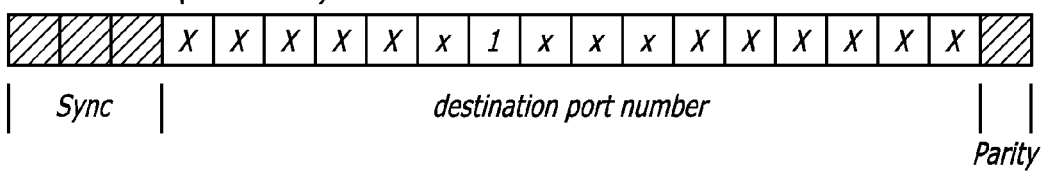
FIG. 4B

Data Word 13 & 14 (IP Header)
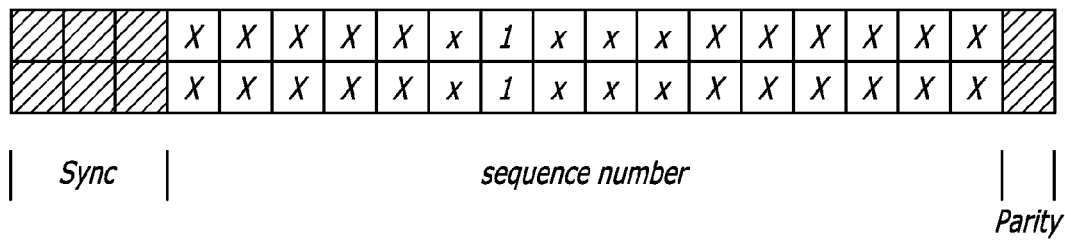
Data Word 15 & 16 (IP Header)
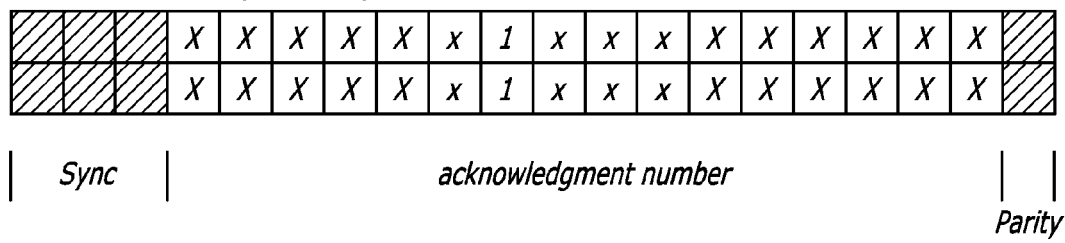
Data Word 17 (TCP Header)
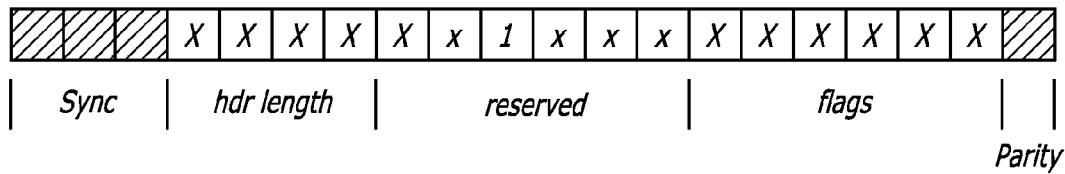
Data Word 18 (TCP Header)
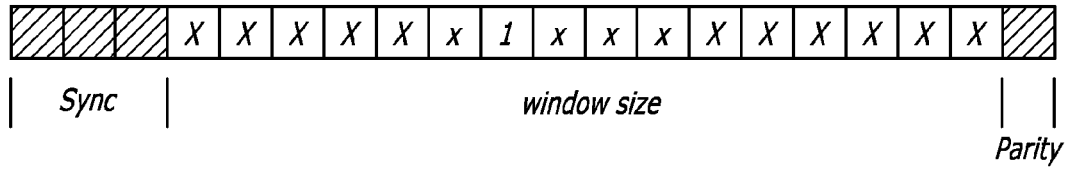
Data Word 19 (TCP Header)
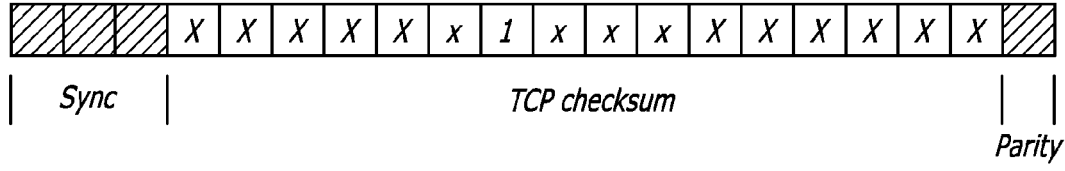
Data Word 20 (TCP Header)
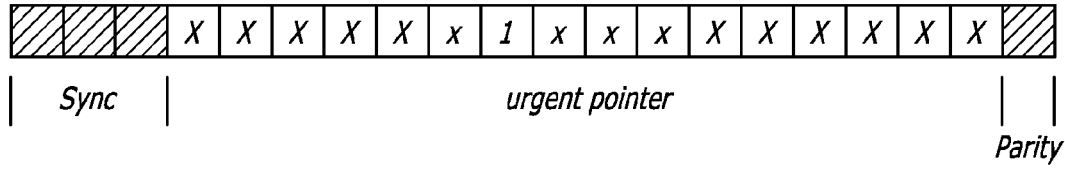
FIG. 4C

*Command Word*
*Message ID: 030R-Begin Cross Domain Message Transfer*
*Description: 1553 to IP message transfer beginning/ending*

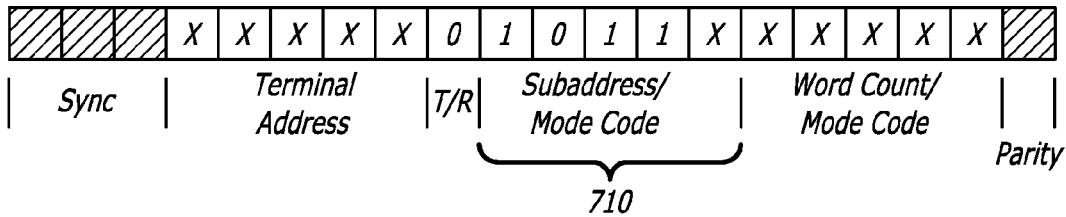

Sync = processed by the hardware
Terminal Address = Data Guard remote terminal address
T/R = 0, remote terminal is to receive data
Mode Code = "11110" (i.e. 30d) = transfer message
Word Count = $0 \leq x \leq 31$ (NOTE: all 0's = 32 words)
Parity (Odd parity is used) = processed by the hardware

*Data Word 1 (the new Command Word)*
*Message ID: 030R-Begin Cross Domain Message Transfer*
*Description: 1553 to IP message transfer beginning/ending*

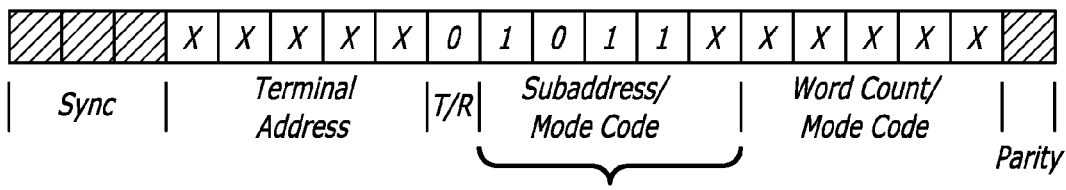

Sync = processed by the hardware
Terminal Address = Receiving Host remote terminal address
T/R = 0, remote terminal is to receive data
Mode Code = xxx
Word Count = $0 \leq x \leq 31$ (NOTE: all 0's = 32 words)
Parity (Odd parity is used) = processed by the hardware

FIG. 7

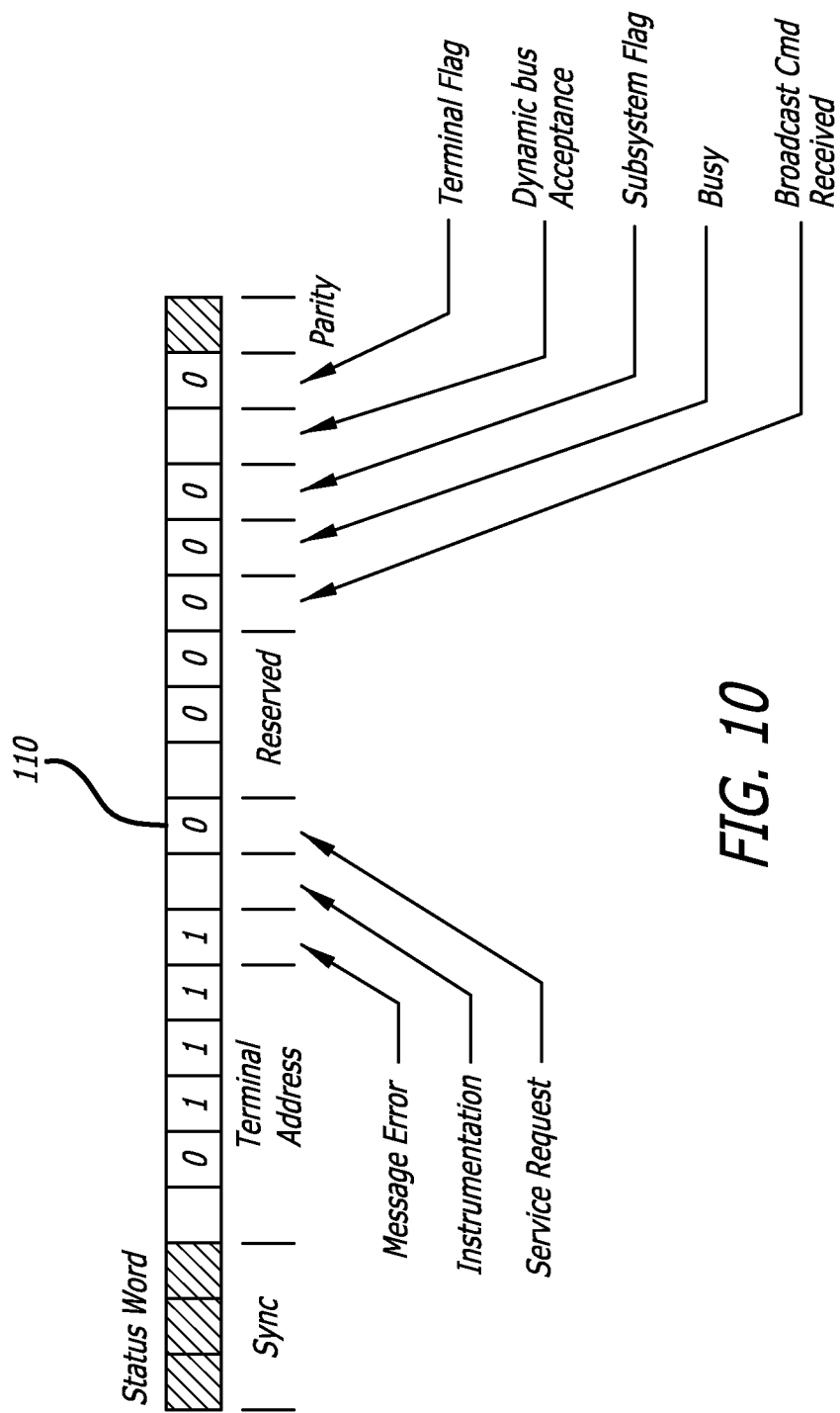

TRUSTED, CROSS DOMAIN INFORMATION SHARING BETWEEN MULTIPLE LEGACY AND IP BASED DEVICES

CROSS-REFERENCE TO RELATED APPLICATION

This application is a Continuation-In-Part application of, and claims the benefit of U.S. patent application Ser. No. 12/322,008, filed Jan. 28, 2009, which is hereby incorporated by reference in its entirety.

BACKGROUND

The present disclosure relates to cross domain information sharing. In particular, it relates to trusted, cross domain information sharing between multiple legacy and IP based devices.

SUMMARY

The present disclosure relates to an apparatus, system, and method for a complex shape structure for trusted, cross domain information sharing between multiple legacy communication and internet protocol (IP) based devices. In a first aspect of the present disclosure, a method for a secure exchange of information from a first host operating in a first security domain (e.g., legacy protocol in a higher security domain) to a second host operating in a second security domain (e.g., IP protocol in a lower security domain) involves transmitting, by the first host, data to a driver in a data guard. The method further involves executing, by the driver, a protocol of the first host; and informing, by the driver, to a first interface that the data is received. Further, the method involves creating, by the data guard, a first task group and a second task group and a filter task group.

Additionally, the method involves establishing, by the second task group, a TCP/IP connection from the second task group to the second host through a second interface; and establishing, by the first task group, a UDP connection from the first task group to the second task group. In addition, the method involves transmitting the data, by the first interface, to the first task group. The method also involves executing, by the first task group, the protocol of the first host; and storing, by the first task group, the data in a file system. Additionally, the method involves receiving, by the filter task group, a file name for the data. After filtering, by the filter task group, the data according to a rule set; changing, by the filter task group, a security level of the data; and forwarding, by the filter task group, the file name to the second task group for forwarding the data to the second host. Also, the method involves reading, by the second task group, the data from the file system; executing, by the second task group, the protocol of the second host; and forwarding, by the second task group, the data to the second host.

In one or more embodiments, the first host employs a legacy communications protocol (i.e. Mil-Std-1553 in the example). In at least one embodiment, the driver operates as a remote terminal. In some embodiments, the first host operates in a top secret or a secret domain. In one or more embodiments, the second host operates in a secret or an unclassified domain. In some embodiments, the data guard includes the driver, the first interface, the second interface, the first task group, the second task group, and the filter task group.

In a second aspect of the present disclosure, a method for a high-to-low security level exchange of information from a first host operating in a higher security domain using a legacy protocol to a second host operating in a lower security domain using some legacy protocol involves transmitting, by the first host, data to a driver in a data guard. The method further involves executing, by the driver, a protocol of the first host; discarding, by the driver, a first command word of the data; and storing, by the driver, the data as a UDP packet. The method also involves writing, by a first interface, the UDP packet to a file; and forwarding, by the first interface, a file name of the file to a network interface. Additionally, the method involves forwarding, by the network interface, the file name to a second interface.

In addition, the method involves creating, by the second interface, a filter task group. Further, the method involves binding, by the filter task group, with the network interface to receive all subsequent UDP packet file names. Also, the method involves filtering, by the filter task group, the UDP packet according to a rule set; and forwarding, by the filter task group, a file name of the filtered UDP packet to the second interface for forwarding to the second host. In addition, the method involves forwarding, by the second interface, the UDP packet to the second host.

In at least one embodiment, the first host and the second host employ the legacy communications protocol (i.e. Mil-Std-1553 in the embodiments where the driver operates as a remote terminal or as a bus controller). In some embodiments, the first host operates in a top secret or secret domain. In at least one embodiment, the second host operates in a secret or an unclassified domain. In one or more embodiments, the data guard includes the driver, the first interface, the second interface, the network interface, and the filter task group.

In a third aspect of the present disclosure, a method for a low-to-high security level exchange of information from a first host operating in a lower security domain using IP protocol to a second host operating in a higher security domain using a legacy protocol involves creating, by a data guard, a first task group and a second task group. Further, the method involves sending, by the first task group, a message to the second task group to inform the second task group that the first task group has been created. The method further involves establishing, by the second task group, a UDP connection with an interface and the first driver. Also, the method involves informing, by a first driver, the second host that the first driver has data for the second host. In addition, the method involves sending, by the second task group, a message to the first task group.

Additionally, the method involves establishing, by the first task group, a TCP/IP connection with the interface and the first host. The method further involves transmitting, by the first host, data to the first driver. Also, the method involves executing, by the first task group, a protocol of the first host; storing, by the first task group, the data in a file system; and sending, by the first task group, a file name of the data to the second task group. The method further involves reading, by the second task group, the data from the file; and forwarding, by the second task group, the data to a second driver. Further, the method involves forwarding, by the second driver, the data to the second host.

In one or more embodiments, the second host employs a legacy communications protocol (i.e. Mil-Std-1553 in this example where the first driver operates as a remote terminal). In some embodiments, the second driver operates as one of a remote terminal and a bus controller. In one or more embodiments, the first host operates in a secret or unclassified domain. In at least one embodiment, the second host operates in a top secret or secret domain. In some embodiments, the data guard includes the first driver, the second driver, the interface, the first task group, and the second task group. In one or more embodiments, the message to inform the second task group that the first task group has been created is sent from the first task group to the second task group through a filter task group.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 1A is an exemplary bind table for internet port A (IPA) of the system of FIG. 1, in accordance with at least one embodiment of the present disclosure.

FIG. 1B is an exemplary route table for network interface (NI) of the system of FIG. 1, in accordance with at least one embodiment of the present disclosure.

FIG. 1C is an exemplary bind table for NI of the system of FIG. 1, in accordance with at least one embodiment of the present disclosure.

FIG. 1D is an exemplary bind table for internet port B (IPB) of the system of FIG. 1, in accordance with at least one embodiment of the present disclosure.

FIG. 1E is an exemplary bind table for internet port C (IPC) of the system of FIG. 1, in accordance with at least one embodiment of the present disclosure.

Figure 2:
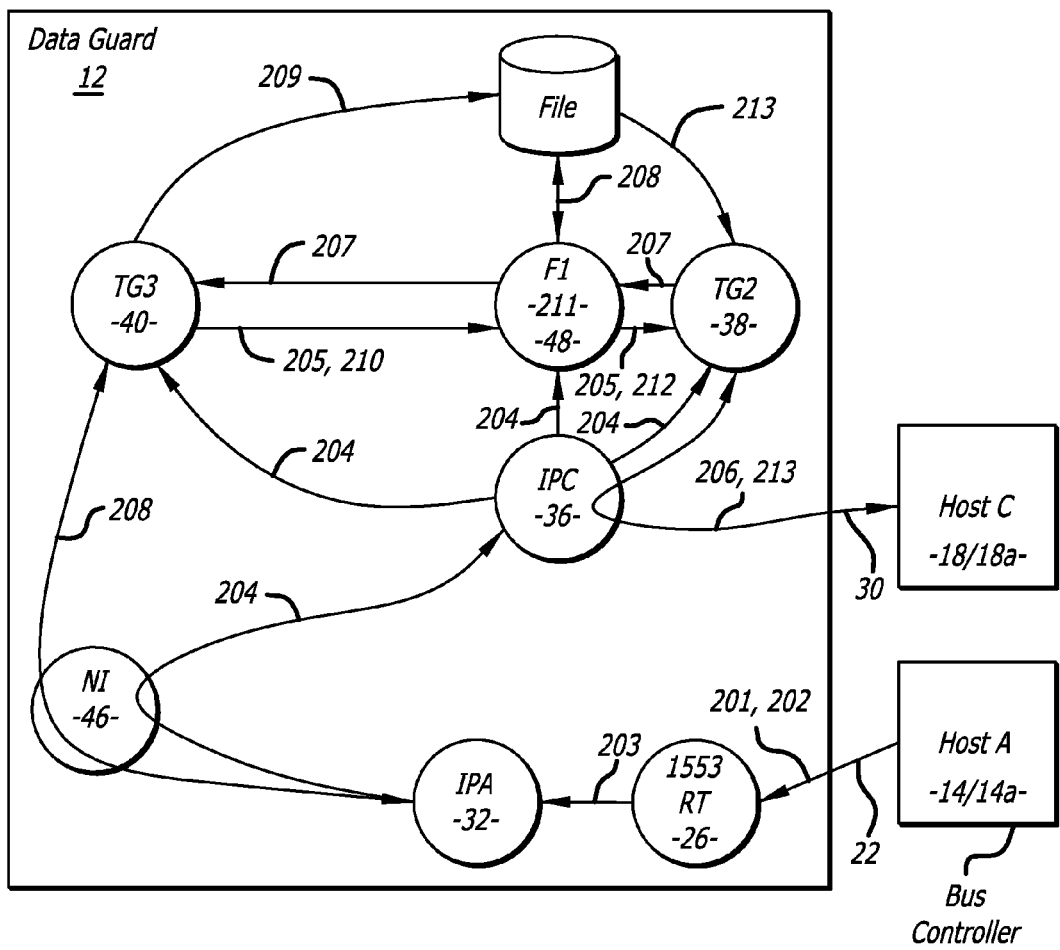
FIG. 2 is a logic flow diagram setting forth operations that may be performed for the system of FIG. 1 in communicating information from a legacy Mil-Std-1553 device with a higher security level domain to an IP device with a lower security level domain, in accordance with at least one embodiment of the present disclosure.
Figure 3:
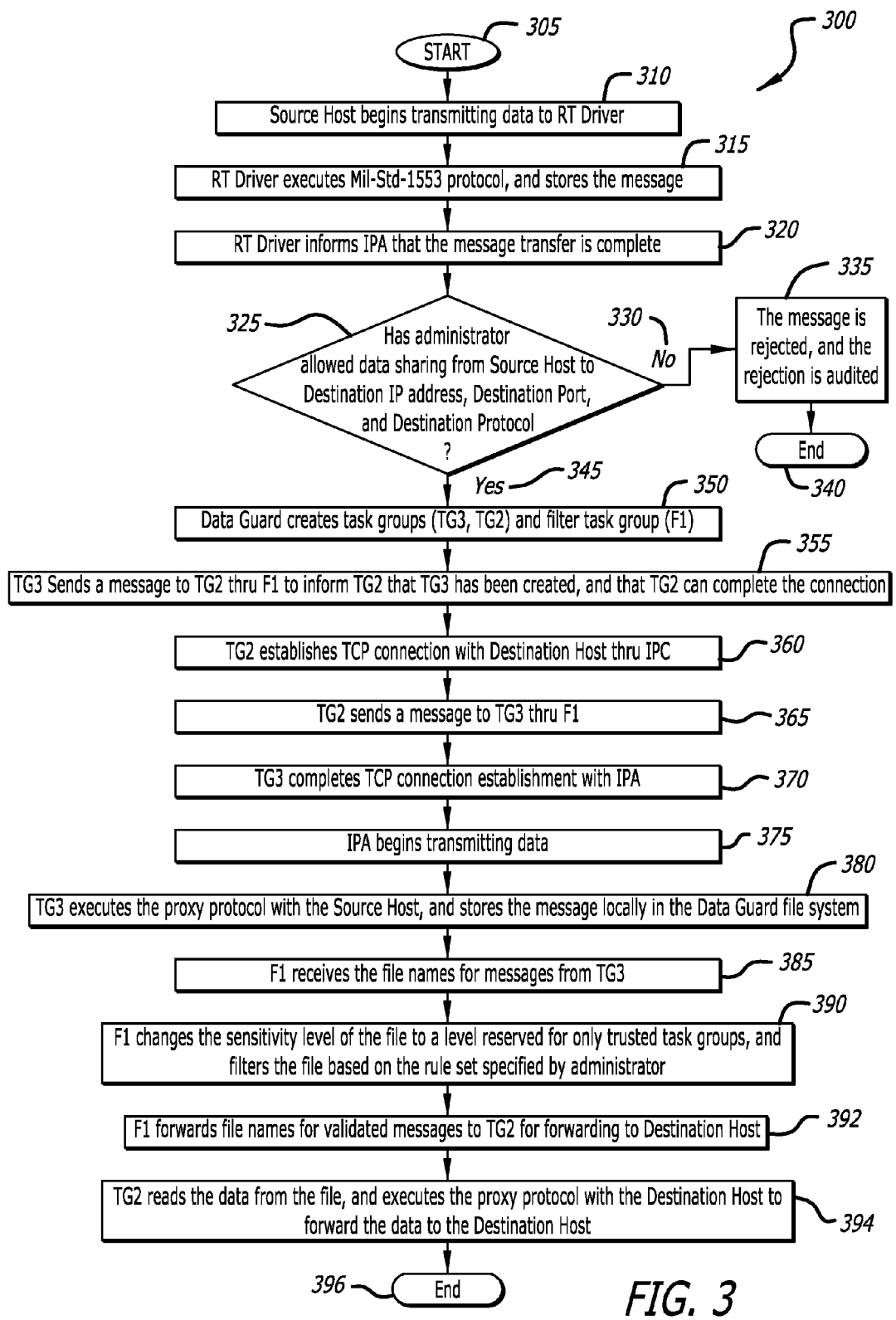
FIG. 3 is a flow chart that further illustrates the operations being performed in the logic diagram of FIG. 2, in accordance with at least one embodiment of the present disclosure.

FIGS. 4A, 4B, and 4C are diagrams demonstrating how a legacy protocol, Mil-Std-1553 in this case, can be used to create the "Begin Cross Domain Message Transfer" message and a "Complete Cross Domain Message Transfer" message for the operations in FIGS. 2 and 3, in accordance with at least one embodiment of the present disclosure.

Figure 1:
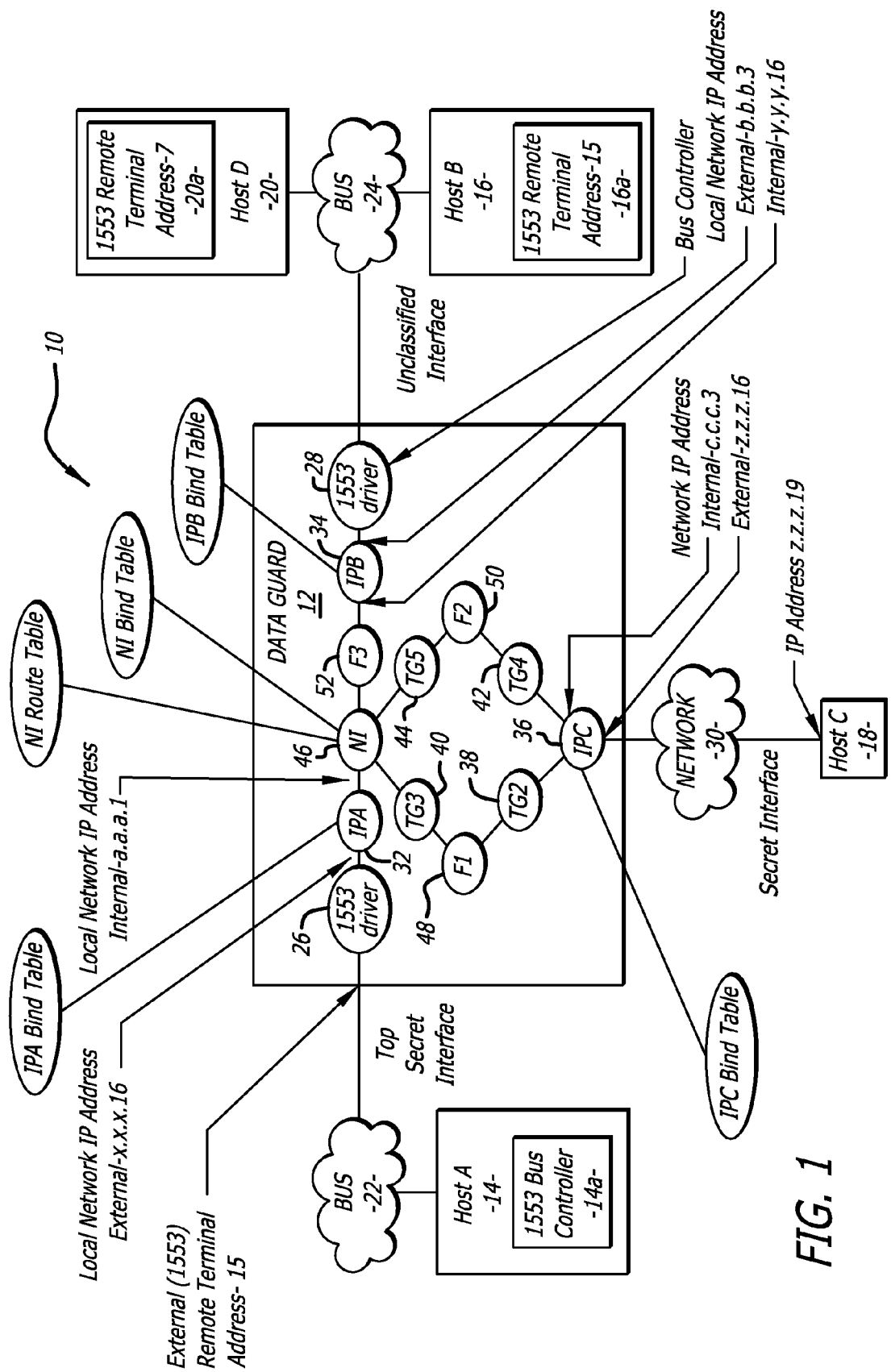
FIG. 1 is a schematic diagram of one exemplary implementation of the disclosed system, in accordance with at least one embodiment of the present disclosure.
Figure 5:
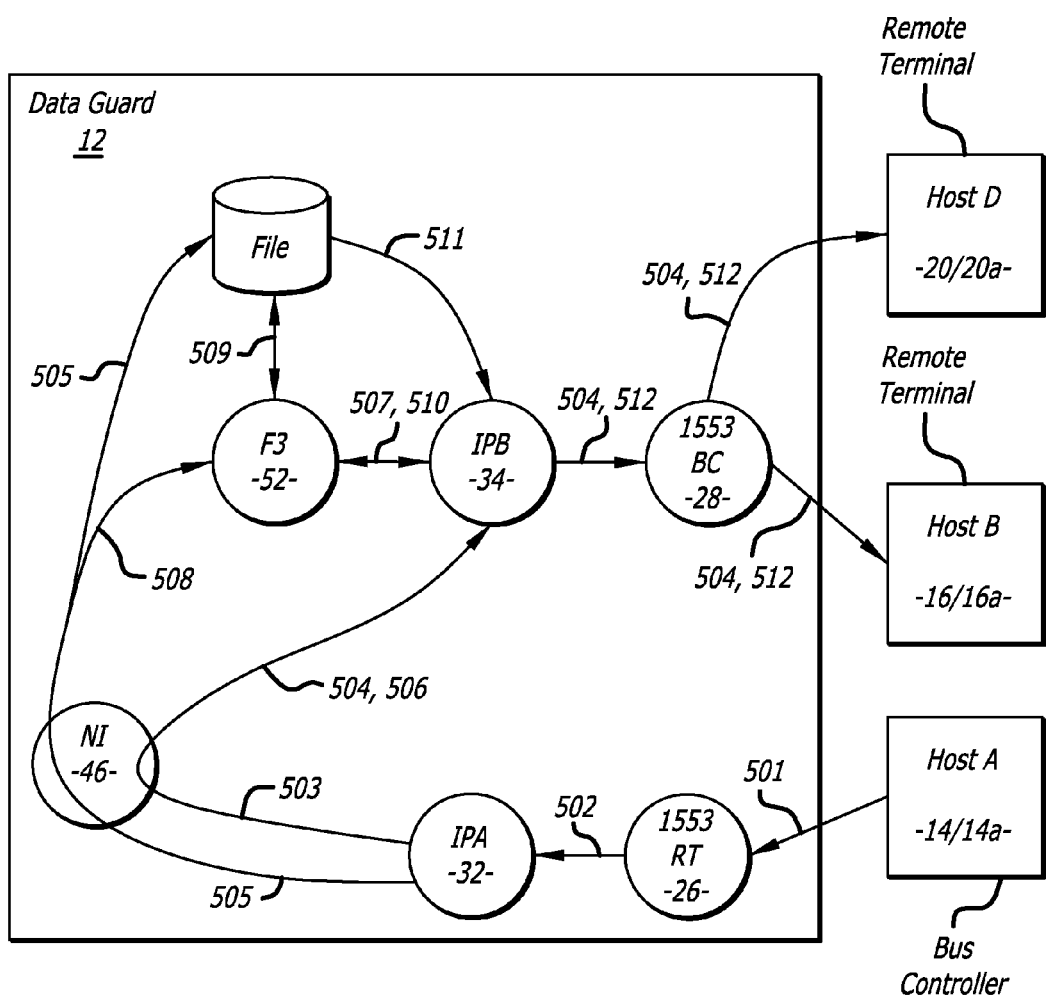

FIG. 5 is a logic flow diagram setting forth operations that may be performed for the system of FIG. 1 in communicating information from a legacy communications protocol (i.e., Mil-Std-1553) device with a higher security level domain to a legacy communications protocol (i.e., Mil-Std-1553) device with a lower security level domain, in accordance with at least one embodiment of the present disclosure.

Figure 6:
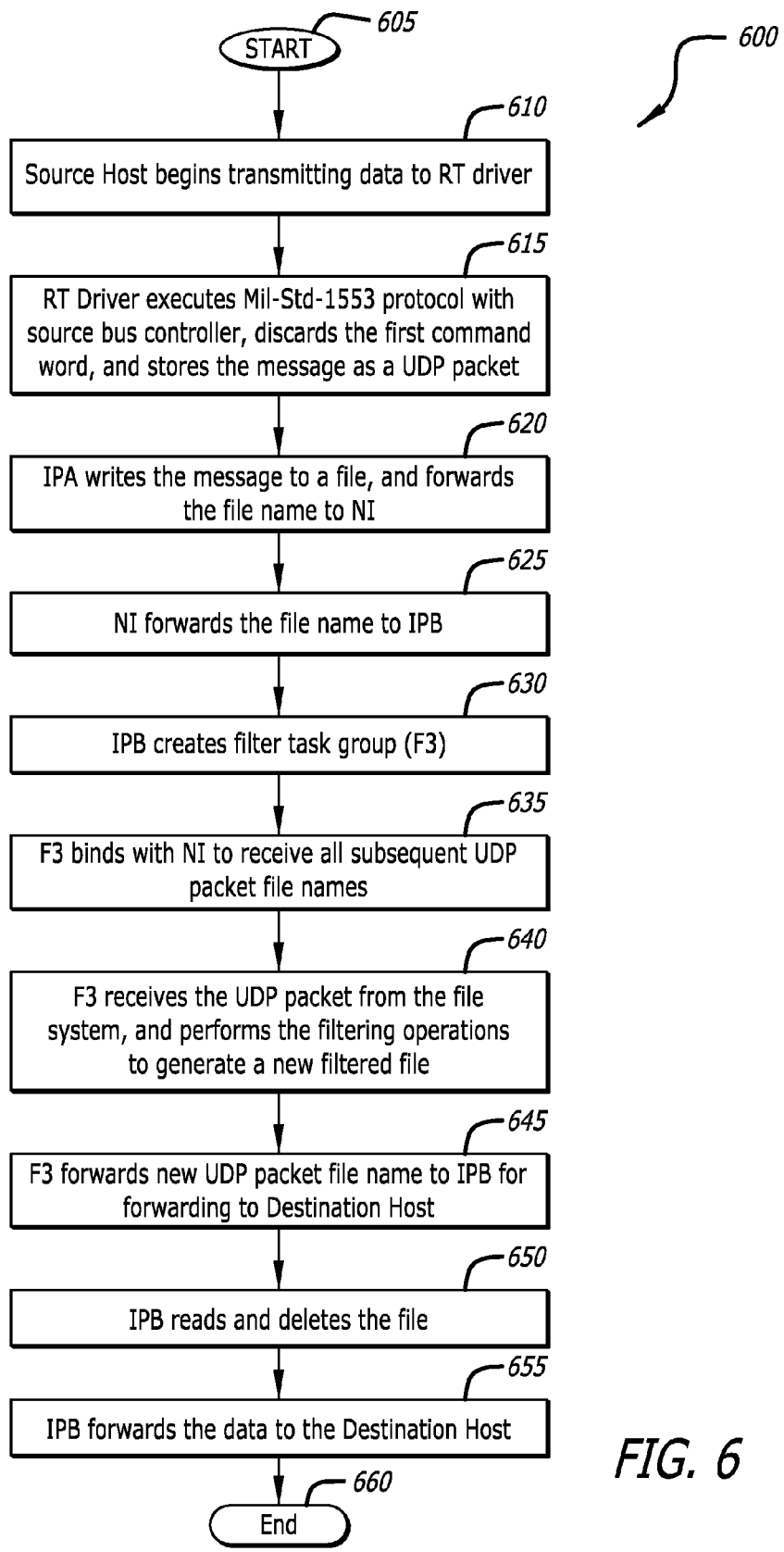

FIG. 6 is a flow chart that further illustrates the operations being performed in the logic diagram of FIG. 5, in accordance with at least one embodiment of the present disclosure.

FIG. 7 is a diagram of a legacy communications protocol (i.e., Mil-Std-1553) command word and new command word illustrating the bit slots used to create a "Begin Cross Domain Message Transfer" message for the operations in FIGS. 5 and 6, in accordance with at least one embodiment of the present disclosure.

Figure 8:
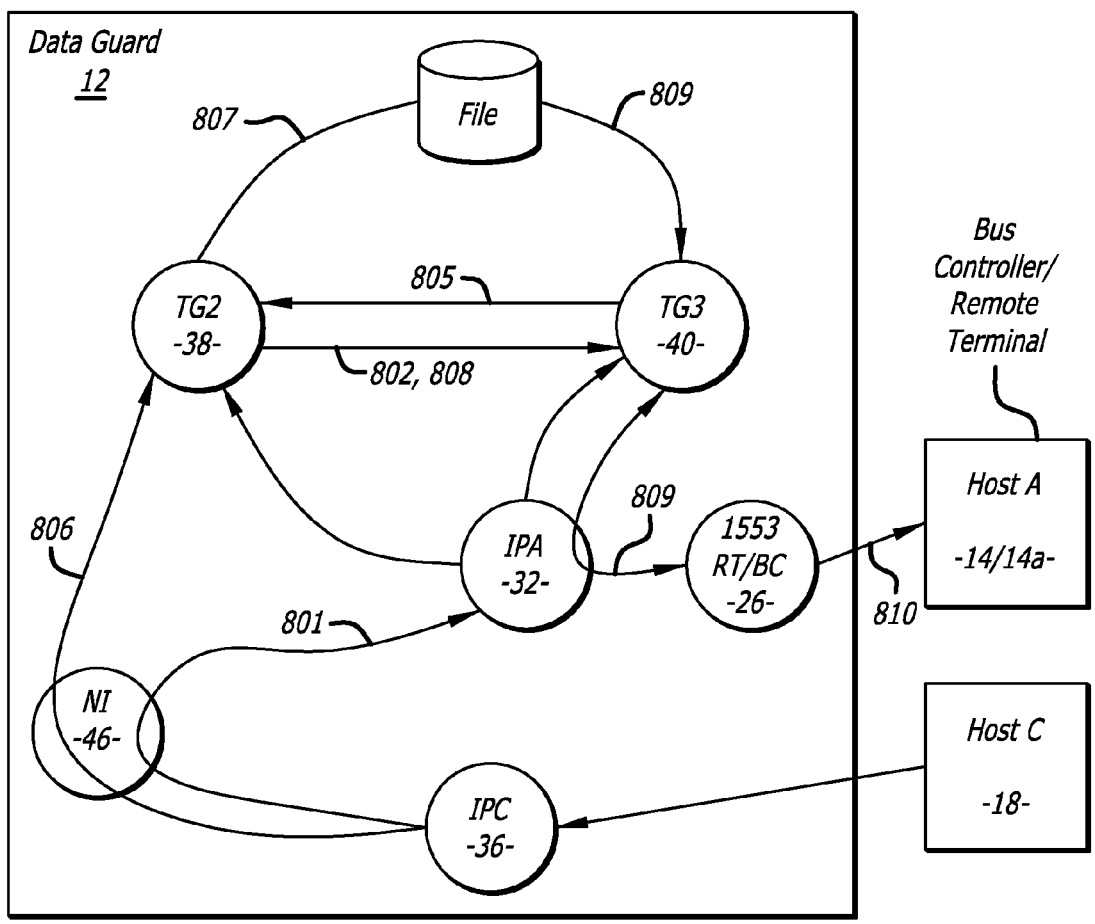

FIG. 8 is a logic flow diagram setting forth operations that may be performed for the system of FIG. 1 in communicating information from an IP device with a lower security level domain to a legacy communications protocol (i.e., Mil-Std-1553) device with a higher security level domain, in accordance with at least one embodiment of the present disclosure.

Figure 9:
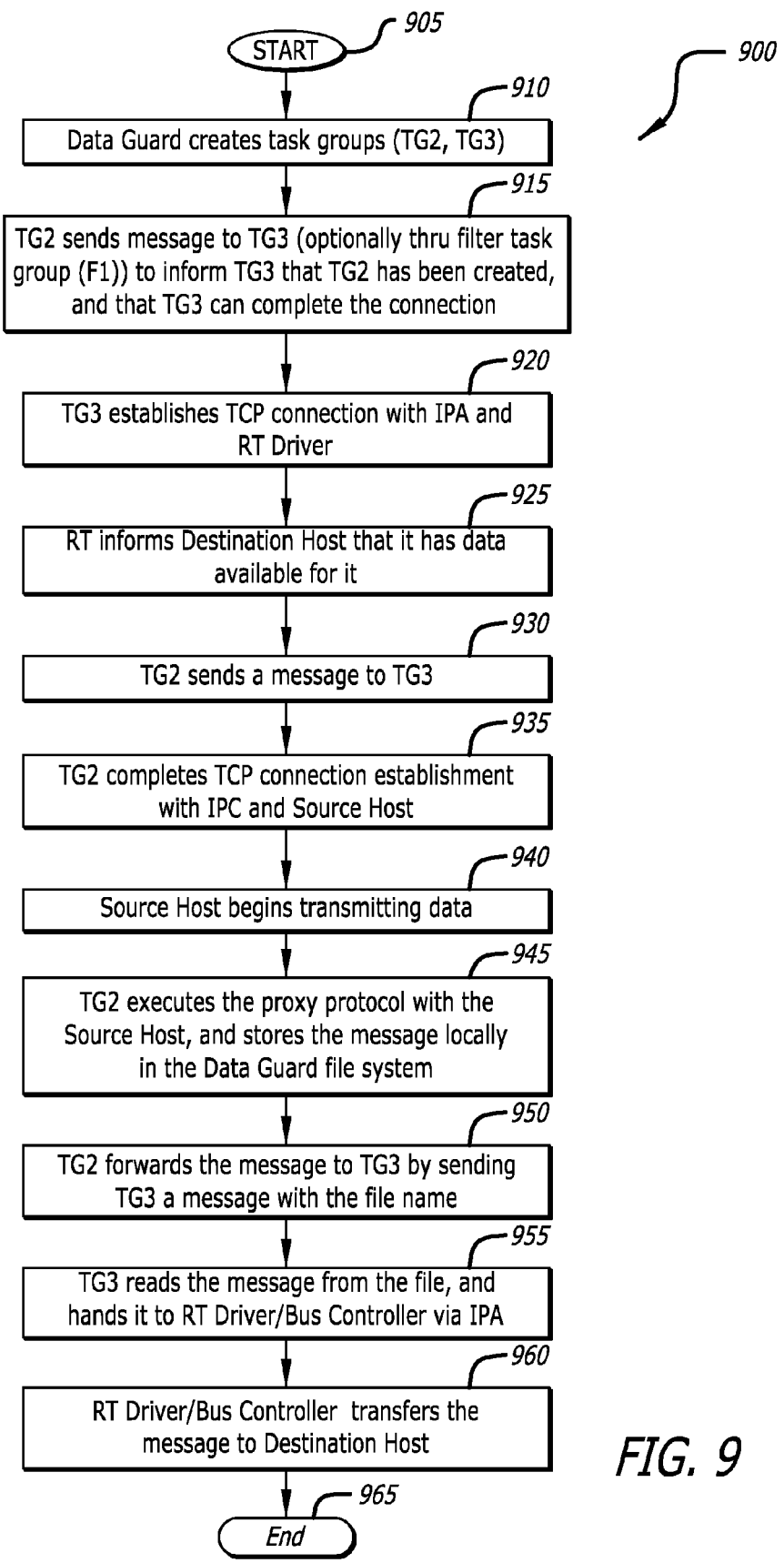

FIG. 9 is a flow chart that further illustrates the operations being performed in the logic diagram of FIG. 8, in accordance with at least one embodiment of the present disclosure.

FIG. 10 is a diagram of a legacy communications protocol (i.e., Mil-Std-1553) status word illustrating the use of its Service Request bit for the operations in FIGS. 8 and 9, in accordance with at least one embodiment of the present disclosure.

DESCRIPTION

The methods and apparatus disclosed herein provide an operative system for cross domain information sharing. Specifically, this system relates to trusted, cross domain information sharing between multiple legacy and internet protocol (IP) based devices. In particular, the system of the present disclosure provides a high assurance means for multiple legacy communication (e.g., Mil-Std-1553 communications protocol) system users and/or devices and multiple IP based network users and/or devices to seamlessly, and in real time, share information across various security domains. Specifically, the system enables multiple legacy communication system protocols and interfaces to communicate with existing IP interfaces and protocols with a high degree of trust. The system includes a configurable filtering capability to allow for data inspection prior to it being passed from one security domain to another security domain.

In general, this disclosure provides a real time means to pass information between, for instance, multiple legacy communication systems executing in and across various security domains and multiple IP based networks operating in other security domains.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 is a schematic diagram of one exemplary implementation of the disclosed system, in accordance with at least one embodiment of the present disclosure. In this figure, a system 10 is shown for communicating information over a filtering Data Guard 12 between a secure first host system (host A) 14, a unclassified second host system (host B) 16, a secure third host system (host C) 18, and a unclassified fourth host system (host D) 20. For convenience, the host systems 14, 16, 18, and 20 will be referred to simply as "host A 14", "host B 16", "host C 18", and "host D 20" respectively. In this example, connections from high to low security domains are shown to have been established between the hosts. It should be noted that these connections are only allowed if the system administrator has in advance enabled a downgrade from the hosts with the higher security domains to the hosts with the lower security domains.

Host A 14 has a legacy communication driver 14a, which in this example is a conventional Mil-Std-1553 bus controller. In addition, host B 16 and host D 20 each have a legacy communication driver 16a, 20a, which in this example is a conventional Mil-Std-1553 remote terminal (RT). It will be appreciated immediately that system 10 may be used to interface any two or more conventional, non-secure host systems operating with any legacy communications protocol. Examples of types of legacy communications protocols that may be employed by non-secure host systems in the disclosed system 10 include, but are not limited to, Link 11, Link 16, RS-232, and RS-485 communications protocols.

In this example, host A 14 may be operating in a first security domain, host C 18 may be operating in a second security domain, and host B 16 and host D 20 may be operating in a third security domain; where the first security domain is higher than the second security domain, and the second security domain is higher than the third security domain.

For the disclosed system, host A 14 may be in communication with the data guard 12 by a bus 22 that forms a top secret interface. Also, host B 16 and host D 20 may be in communication with the data guard 12 by a bus that forms an unclassified interface. In addition, host C 18 may be in communication with the data guard 12 via a network that forms a secret interface. The data guard 12 in this example may include components that have been demonstrated or certified to be in compliance with predetermined security standards, but which now help to form the new system 10. The system 10, as will be explained in greater detail in the following paragraphs, is able to accommodate information exchange between multiple conventional (i.e. legacy) systems operating in various security domains and multiple IP based networks operating in other security domains. One such data guard suitable to be employed by the disclosed system 10 is the Boeing Secure Network Server, operated by the Boeing Company, the assignee of the present disclosure.

The data guard 12 in this example is interfaced to host A 14 via bus 22 and a first, conventional legacy component (e.g., Peripheral Component Interconnect) card and software driver 26, used in the data guard 12. Similarly, both host B 16 and host D 20 may be interfaced via an unclassified bus 24 and a second, legacy component (e.g., PCI card) and software driver also used in the data guard 12. In addition, the data guard 12 is interfaced to host C 18 via a network 30. For convenience, the first and second legacy components 26, 28 will be referred to throughout the following discussion simply as "first driver" 26 and "second driver" 28. In this example, the first driver 26 may be viewed as a remote terminal and the second driver 28 as a bus controller.

The data guard 12 further includes three virtual internet interfaces 32, 34, 36. These three internet ports are internet port A (IPA) 32, internet port B (IPB) 34, and internet port C (IPC) 36. Each internet port 32, 34, 36 has both an internal network IP address and an external network IP address, as is shown in the figure. Further, the data guard 12 includes four proxy task groups 38, 40, 42, 44. These proxy task groups are TG2 (or "first proxy task group") 38, TG3 (or "second proxy task group") 40, TG4 (or "third proxy task group") 42, and TG5 (or "fourth proxy task group") 44. Task groups 38, 40, 42, 44 are dynamically created and terminated as sessions are created and terminated.

In addition, the data guard 12 also includes a network interface (NI) 46. All of the connections in the data guard 12 communicate through the NI 46. Also, the data guard 12 includes three filter groups (hereinafter F1 48, F2 50 and F3 52. The filters 48, 50, 52 are used for filtering received information packets that are being re-graded from one security domain to another. In this example, filter F1 48 is interposed between IPA 32 and IPC 36. Also, filter F2 50 is interposed between IPC 36 and IPB 34. Additionally, filter F3 52 is interposed between IPA 32 and IPB 34.

Also shown in this figure, each subscriber device interface (i.e. IPA 32, IPB 34, IPC 36, and NI 46) has a bind table, which contains internet protocol (IP) addresses that the interface is bound. Interfaces will respond to the IP addresses that are bound to it. IPA 32, IPB 34, IPC 36, and NI 46 maintain the bind tables. The bind tables are used to enable IPA 32, IPB 34, IPC 36, and NI 46 to deliver datagrams to the correct destinations by ensuring that the correct local and remote socket information is inserted into the user datagram protocol (UDP)/transmission control protocol (TCP) and IP headers.

Referring now to FIG. 2, and also to the flow diagram 300 of FIG. 3, various operations are shown that may be performed in implementing system 10 of FIG. 1 to effect a high-to-low security level exchange of information (i.e. information packets) from legacy host A 14 operating in secure top secret domain to IP host C 18 operating in secure secret domain (i.e. a data downgrade). The first driver 14a of the first host (host A) 14 may initiate the connection with the data guard 12 and, in one embodiment, specifies the connection sensitivity level, which in this example is a top secret sensitivity. The outboard interface, in this example network 30, must be designated by a system administrator in advance as a "downgrade" interface, meaning that it is at a lower security level than the inbound interface bus 22. The inbound interface bus 22 may also be thought of as an "upgrade" interface bus. The system administrator must also specify in advance that there will be a filter task group for the outboard interface, as well as specifies the support files to be used by the filter task group during the information exchange between the two hosts (host A and host C) 14, 18.

At the start (operation 305 of FIG. 3) the first host (Host A) 14 (i.e. the source host) begins transmitting data over the top secret bus 22 to the first driver 26, as indicated by line 201 of FIG. 2 (operation 310 of FIG. 3). The first driver 26 executes the legacy communication protocol with the source host 14 to the data guard 12, as indicated by line 202 (operation 315). In this example, the first driver 26 acts as a remote terminal and executes Mil-Std-1553 protocol with the first driver 14a acting as a bus controller. The first command word and its associated data words will contain the IP datagram and TCP headers. This particular message transfer protocol will be described in detail during the discussion of FIGS. 4A, 4B, and 4C. It is this protocol that provides the legacy to multiple IP interface capabilities.

The first driver 26 stores the message that it has received from the source host 14, as indicated by line 202 (operation 315). Once the message transfer to the first driver 26 is complete, the first driver 26 informs IPA 32 that the message transfer has been completed, as indicated by line 203 (operation 320). NI 46 determines if the system administrator has, in advance, as indicated by the data word of the first command word, enabled data sharing from the legacy source device 14 to the destination IP address, destination port, and protocol (operation 325). If NI 46 determines that the system administrator has not enabled this data transfer (operation 330), the message is rejected and the rejection is audited (operation 335). The process then terminates after these actions (operation 340).

However, if NI 46 determines that the system administrator has enabled this data transfer (operation 345), then the data transfer process continues. Upon initiation of the connection with the IPA 32, the data guard 12 creates two task groups (TG3 40 and TG2 36), which are needed for the data upgrade, as well as creates a filter task group (F1 48), as indicated by lines 204 (operation 350).

Task group TG3 40 then sends a message through the filter task group F1 48 to task group TG2 38 to inform task group TG2 38 that task group TG3 40 has been created and, as such, task group TG2 38 can complete the connection, as indicated by line 205 (operation 355). Upon receiving the message from task group TG3 40, task group TG2 38 establishes a TCP/IP connection with the destination Host C 18 through IPC 36, as indicated by line 206 (operation 360).

Task group TG2 38 then sends a message to task group TG3 40 through filter task group F1, as indicated by lines 207 (operation 365). After receiving the message from task group TG2 38, task group TG3 40 establishes a UDP connection with IPA 32, as indicated by line 208 (operation 370). After the connection is established, the IPA 32 begins transmitting data (operation 375). The connection from the IPA 32 to task group TG3 40 operates at the source-specified sensitivity level (i.e. the sensitivity level of Host A 14, which in this example is top secret). The connection to the destination Host C 18 from task group TG2 38 operates at a level within the destination host's range (i.e. the sensitivity level of Host C 18, which in this example is secret).

Task group TG3 40 then executes the proxy protocol of the source Host A 14 (i.e. Mil-Std-1553), and stores the received message locally in the data guard file system, as indicated by line 209 (operation 380). Small messages are stored in random access memory (RAM) files, while large messages are stored on the hard drive.

Then, task group TG3 40 sends the file names for the messages to filter task group F1. Filter task group F1 receives the file names for the messages from task group TG3 40, as indicated by line 210 (operation 385). After filter task group F1 receives the file names for the messages, filter task group F1 changes the sensitivity level of the files to a level reserved for only trusted task groups (i.e. a downgraded sensitivity level), and filters the files based on a rule set specified by the system administrator, as indicated by line 211 (operation 390). The filter task group F1 then forwards the file names for the validated messages (i.e. the filtered files) to task group TG2 38 for forwarding to the destination Host C 18, as indicated by line 212 (operation 392). After receiving the file names, task group TG2 38 reads the data from the files, and executes the proxy protocol with the destination Host C 18 (i.e. IP protocol) to forward the data to the destination Host C 18, as indicated by line 213 (operation 394). After the files are forwarded to the destination Host C 18 for processing, the process ends (operation 396).

The above described operation provides several important advantages. For one, standard legacy drivers are relatively inexpensive, and easily implemented within the data guard 12. The data guard 12 ensures that the two hosts 14 and 18 do not share memory, and do not communicate directly with one another. The use of task group TG3 40 and task group TG2 38 provides trusted gates that enable controlled communication between the hosts 14 and 18, and that hide access to send and receive functions. In this way, the first Host A 14, its users, processes, and data are effectively isolated from the second Host C 18, its users, and processes.

For the above-described operations of FIGS. 2 and 3, it would be helpful to create two new Mil-Std-1553 control codes. These codes may be transmitted within the "Subaddress/Mode Code" bit slots denoted by reference number 410 in FIG. 4A. With reference to FIGS. 4A, 4B, and 4C, the bit construction of a Mil-Std-1553 protocol message is shown. A message "10110" (Begin Cross Domain Message Transfer) may be created to indicate that the message is a cross domain information sharing message. As such, this message is used to begin and continue the cross domain data transfer. In one example, this particular control code could be used to instruct the performance of the following functions: (1) continue reading the command and data words until a "Complete Cross Domain Message Transfer" message is received, (2) discard the command words, (3) package the data words in the order received into an IP based message, (4) pass the new IP based message to the data guard filter for content validation, (5) if the content is validated, then pass it to the IP based network, (6) if the content is not validated, audit the bad message and discard it.

Also, a command of "10111" (Complete Cross Domain Message Transfer) may be created to indicate that the message is the last message containing cross domain data. Thus, this command is used to end the cross domain data transfer. In one example, this particular control code could be used to instruct the performance of the following functions: (1) verify that the IP data received equals the total length value of the IP header (i.e. data word 2), (2) if it is unequal, reject the message and audit the rejection.

Referring now to FIG. 5, and also to the flow diagram 600 of FIG. 6, various operations are shown that may be performed in implementing system 10 of FIG. 1 to effect a high-to-low security level exchange of information (i.e. information packets) from legacy Host A 14 operating in secure top secret domain to legacy Host B 16 or legacy Host D 20 operating in an unclassified domain (i.e. a data downgrade). The first driver 26 of the first host (Host A) 14 may initiate the connection with the Data Guard 12 and, in one embodiment, specifies the connection sensitivity level, which in this example is a top secret sensitivity. The outboard interface, in this example unclassified bus 24, in one embodiment, is designated by a system administrator in advance as a "downgrade" interface, meaning that it is at a lower security level than the inbound interface bus 22. Also, for traffic flowing in the opposite direction, the inbound interface bus 22 may also be thought of as an "upgrade" interface bus. The system administrator also, in one embodiment, specifies in advance that there will be a filter task group for the outboard interface, as well as specifies the support files to be used by the filter task group during the information exchange between the hosts (Host A with Host B or Host D) 14, 16, 20.

At the start (operation 605 of FIG. 6) the first host (Host A) 14 (i.e. the source host) begins transmitting data over the top secret bus 22 to the first driver 26, as indicated by line 501 of FIG. 5 (operation 610 of FIG. 6). The first driver 26 executes the legacy communication protocol with the source Host A 14 to the data guard 12, as indicated by line 501 (operation 615). In this example, the first driver 26 acts as a remote terminal and executes Mil-Std-1553 protocol with the first host driver 14a acting as a bus controller.

The first driver 26 discards the first command word and stores the message that it has received from the source Host A 14 as a UDP packet, also as indicated by line 502 (operation 615). The connection from the source Host A 14 to NI 46 via first driver 26 and IPA 32 operates at the source-specified sensitivity level (i.e. Top Secret), as indicated by line 503. The connection to the destination host (Host B or Host D) 16, from NI 46 via IPB 34 and second driver 28 operates at a level within the destination hosts range (i.e. unclassified), as indicated by lines 504. In this example, the second driver 28 acts as a bus controller.

Once the message transfer to the first driver 26 is complete, IPA 32 writes the message to a file, and forwards the file name to NI 46, as indicated by lines 505 (operation 620). NI 46 forwards the file name to IPB 34, as indicated by line 506 (operation 625). Once IPB 34 receives the file name, IPB creates filter task group F3 52, as indicated by line 507 (operation 630). Filter task group F3 52 binds with NI 46 to receive all subsequent UDP packet file names for this connection, as indicated by line 508 (operation 635). By "bind" the filter task group F3 52 is configured to communicate with NI 46.

Filter task group F3 52 receives the UDP packet file from the file system (i.e. File), and performs filtering operations, which comprise filtering the file, deleting the old file name, and writing the new filtered file back to the file system, as indicated by line 509 (operation 640). Filter task group F3 52 forwards the new UDP packet file name to IPB 34 for forwarding to the destination host (Host B or Host D) 16, 20, as indicated by line 510 (operation 645). Then, IPB 34 reads and deletes the file, as indicated by line 511 (operation 650). IPB forwards the data to the destination host (Host B or Host D) 16, 20, as indicated by line 512 (operation 655). To forward the data, IPB 34 extracts the data from the UDP packet, and executes the Mil-Std-1552 protocol utilizing driver 28 (i.e. bus controller) with the appropriate destination host remote terminal (i.e. Host B's remote terminal or Host D's remote terminal) 16a, 20a whose address is the new command word (i.e. the first data word of the first message received—this protocol will be described in the discussion of FIG. 7). After IPB 34 forwards the data, the process ends (operation 660).

For the above-described operations of FIGS. 5 and 6, it would be helpful to create a new Mil-Std-1553 control code. This code may be transmitted within the "Subaddress/Mode Code" bit slots denoted by reference numbers 710 and 720 in FIG. 7. With reference to FIG. 7, the bit construction of a Mil-Std-1553 protocol message is shown. For the disclosed system, the bus controller is able to send data to a specific remote terminal address (or it can broadcast the data to all remote terminals on the data bus. However, there is currently no way for the bus controller in one security domain (e.g., bus controller 14a for Host A 14) to communicate to one of several remote terminals in another domain (e.g., remote terminals 16a, 20a for Hosts B 16 and Host D 20). The remote terminal address is located in the first five (5) bits of the command word. The mode code and word count are also contained in this command word. Command words are followed by a data word. By defining a new mode code, for example thirty (30), for indicating that the message is a cross domain transfer message, we can indicate to the data guard 12 that it needs to discard the command word received, and that the first data word is the actual command word for the cross domain message to be delivered to either Host B or Host D based on the terminal address in this new command word. This new command word contains the mode code relating to the data words that follow. For internal routing purposes and filtering, this new Mil-Std-1553 message would be wrapped by the data guard driver 26 with UDP/IP headers, which are removed by the data guard bus controller when it receives the message for transmitting to the new address in the new Mil-Std-1553 header.

Referring now to FIG. 8, and also to the flow diagram 900 of FIG. 9, various operations are shown that may be performed in implementing system 10 of FIG. 1 to effect a low-to-high security level exchange of information (i.e. information packets) from IP Host C 18 operating in a secure secret domain to legacy Host A operating in a secure top secret domain (i.e. a data upgrade). In this example, filtering is optional, but will be included in this discussion to provide the reader with a description of how the filter may be implemented in a low-to-high security level communication method in accordance with the present disclosure. The outbound interface (i.e. first driver 26) should be designated by the security administrator as an upgrade interface (i.e. an interface having a higher security level than the inbound interface), and is preconfigured to act as a remote terminal or a bus controller. The security administrator defines which hosts are allowed to communicate with each other. In this example, that definition would include Host C 18 being able to communicate with Host A 14. In one alternative, the security administrator specifies the support files used by the filter, if the filter is being used. It should be noted that the filter is not shown in FIG. 8.

In this example, data is initially provided by Host C. At the start (operation 905), upon initiation of the connection (i.e. reception of the TCP SYN message), the data guard 12 creates task groups TG2 38 and TG3 40, which are needed for the upgrade, as indicated by line 801 (operation 910). Once task groups TG2 38 and TG3 40 are created, task group TG2 38 sends a message to task group TG3 40 via filter task group F1 48, if installed, to inform TG3 40 that TG2 38 has been created and that TG3 40 can complete the connection, as indicated by line 802 (operation 915). After task group TG3 40 receives the message, task group TG3 40 establishes the TCP connection with IPA 32 and the Mil-Std-1553 remote terminal 26 (operation 920). Upon the next status word response to the destination host (Host A) 14, the remote terminal 26 informs the destination host (Host A) 14 that it has data available for it (operation 925).

Then, task group TG3 40 sends a message to task group TG2 38, as indicated by line 805 (operation 930). Once task group TG2 38 receives the message, task group TG2 38 completes the UDP connection establishment with IPC 36 and the source host (Host C) 18, as indicated by line 806 (operation 935). In a typical write-up connection, the source host (Host C) 18 begins transmitting data, as indicated by line 806 (operation 940). The connection from the source host (Host C) 18 to the task group TG2 38 operates at the source-specified sensitivity level (i.e. secret). The connection from the destination host (Host A) 14 to task group TG3 40 operates at a level within the destination host's target range (i.e. top secret).

Task group TG2 38 executes the proxy protocol with the source host (Host C) 18, and stores the message locally in the data guard file system (i.e. File), as indicated by line 807 (operation 945). Small messages are stored in RAM files, while large messages are stored on the hard drive. Once the message transfer is complete, task group TG2 38 forwards the message to task group TG 40 by sending TG3 40 a message with the file name, as indicated by line 808 (operation 950). This occurs by calling trusted software that upgrades the file to the level of task group TG3 40, and sending a message to task group TG3 40 informing task group TG3 40 that a new message is ready to be forwarded to the destination host (Host A) 14. Task group TG3 40 reads the message from the file, and forwards it to first driver 26, which is operating as a remote terminal or bus controller, via IPA 32, as indicated by line 809 (operation 955). The first driver 26 transfers the message to the destination host (Host A) 14, as indicated by line 810 (operation 960). After the message is forwarded to the destination Host A 14, the process ends (operation 965).

For the cases where the driver (e.g., first driver 26) for the destination host (e.g., Host A 14) is operating as a Mil-Std-1553 bus controller interface, for each message, the IP header data is removed, and the message is transmitted to the destination host (e.g., host A 14) using the standard Mil-Std-1553 protocol.

For the cases where the driver (e.g., first driver 26) for the destination host (e.g., host A 14) is operating as a remote terminal, two new Mil-Std-1553 control codes need to be defined. These codes may be transmitted within the "Subaddress/Mode Code" bit slots (refer to reference number 410 in FIG. 4A). Referring to FIGS. 4A, 4B, and 4C again, the bit construction of a Mil-Std-1553 protocol message is shown. A message "11000" (Xmt Cross Domain Data) may be created to indicate that the bus controller 26 is ready to receive the cross domain information sharing data from the IP based network 30. In addition, a command of "11001" (Xmt Cross Domain Data Complete) may be created to indicate that the bus controller 26 has received all the cross domain information sharing data from the IP based network 30.

Also, for the cases where the driver (e.g., first driver 26) for the destination host (e.g., Host A 14) is operating as a remote terminal, the remote terminal utilizes the Service Request Bit (refer to reference number 110 in FIG. 10) in the remote terminal status word response to indicate to the bus controller (e.g., bus controller 14a) that it has cross domain information data to pass to it. The bus controller (e.g., bus controller 14a) sends a Xmt Cross Domain Data command with the T/R (transmit/receive) bit set to transmit (i.e. 1) to indicate to the remote terminal that it is ready to receive the cross domain data. The remote terminal responds with a status word to the bus controller followed immediately by the cross domain data from the IP network. The first data word indicates the number of data words in the cross domain message. The bus controller receives the cross domain data. If the number of data words received by the bus controller does not match the number that is expected (i.e. the expected amount is based on the first data word), then the bus controller resends the Xmt Cross Domain Data command message, otherwise it sends the Xmt Cross Domain Data Complete message. The remote terminal replies with the status message as always.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for a high-to-low security level exchange of information from a first host operating in a higher security domain using a legacy protocol to a second host operating in a lower security domain using internet protocol (IP), the method comprising:
   transmitting, by the first host, data to a driver in a data guard;
   establishing, by a second task group, a transmission control protocol (TCP) connection from the second task group to the second host through a second interface;
   establishing, by a first task group, a user datagram protocol (UDP) connection from the first task group to the second task group;
   transmitting the data, by a first interface, to the first task group;
   storing, by the first task group, the data in a file system;
   receiving, by a filter task group, a file name for the data;
   filtering, by the filter task group, the data according to a rule set;
   changing, by the filter task group, a security level of the data;
   forwarding, by the filter task group, the file name to the second task group for forwarding the data to the second host; and
   forwarding, by the second task group, the data to the second host,
   wherein the first task group and the second task group allow for processes of the first host to be isolated from processes of the second host,
   wherein the second host operates in one of a secret domain and an unclassified domain.

2. The method of claim 1, wherein the first host employs the Mil-Std-1553 communications protocol.

3. The method of claim 1, wherein the driver operates as a remote terminal.

4. The method of claim 1, wherein the first host operates in one of a top secret domain and a secret domain.

5. The method of claim 1, wherein the data guard includes the driver, the first interface, the second interface, the first task group, the second task group, and the filter task group.

6. A method for a high-to-low security level exchange of information from a first host operating in a higher security domain using a legacy protocol to a second host operating in a lower security domain using the legacy protocol, the method comprising:
   transmitting, by the first host, data to a driver in a data guard;
   discarding, by the driver, a first command word of the data;
   storing, by the driver, the data as a user datagram protocol (UDP) packet;
   writing, by a first interface, the UDP packet to a file;
   forwarding, by the first interface, a file name of the file to a network interface;
   forwarding, by the network interface, the file name to a second interface;
   binding, by a filter task group, with the network interface to receive all subsequent UDP packet file names;
   filtering, by the filter task group, the UDP packet according to a rule set;
   forwarding, by the filter task group, a file name of the filtered UDP packet to the second interface for forwarding to the second host; and
   forwarding, by the second interface, the UDP packet to the second host,
   wherein the second host operates in one of a secret domain and an unclassified domain.

7. The method of claim 6, wherein the first host and the second host employ the Mil-Std-1553 communications protocol.

8. The method of claim 6, wherein the driver operates as a remote terminal.

9. The method of claim 6, wherein the first host operates in one of a top secret domain and a secret domain.

10. The method of claim 6, wherein the data guard includes the driver, the first interface, the second interface, the network interface, and the filter task group.

11. A method for a low-to-high security level exchange of information from a first host operating in a lower security domain using internet protocol (IP) to a second host operating in a higher security domain using a legacy protocol, the method comprising:
   establishing, by a second task group, a user datagram protocol (UDP) connection with an interface and a first driver;
   informing, by the first driver, the second host that the first driver has data for the second host;
   sending, by the second task group, a message to a first task group;
   establishing, by the first task group, a transmission control protocol (TCP) connection with the interface and the first host;
   transmitting, by the first host, data to the first driver;
   storing, by the first task group, the data in a file system;
   sending, by the first task group, a file name of the data to the second task group;
   forwarding, by the second task group, the data to a second driver; and forwarding, by the second driver, the data to the second host,
wherein the first task group and the second task group allow for processes of the first host to be isolated from processes of the second host,
wherein the second host operates in one of a top secret domain and a secret domain.

12. The method of claim 11, wherein the second host employs the Mil-Std-1553 communications protocol.

13. The method of claim 11, wherein the first driver operates as a remote terminal.

14. The method of claim 11, wherein the second driver operates as a remote terminal.

15. The method of claim 11, wherein the second driver operates as a bus controller.

16. The method of claim 11, wherein the first host operates in a secret domain.

17. The method of claim 11, wherein the first host operates in an unclassified domain.

\* \* \* \* \*